United States Patent [19]
Reo

[11] Patent Number: 6,092,639
[45] Date of Patent: Jul. 25, 2000

[54] DRIVEN WHEEL PASSENGER CONVEYOR

[75] Inventor: Seung Dae Reo, Changwon-Si, Rep. of Korea

[73] Assignee: LG Industrial Systems Co., Ltd., Seoul, Rep. of Korea

[21] Appl. No.: 08/967,304

[22] Filed: Oct. 21, 1997

[30] Foreign Application Priority Data

Oct. 22, 1996 [KR] Rep. of Korea ..................... 96-47425

[51] Int. Cl.$^7$ ........................... B66B 21/00; B66B 23/24; B65G 39/10; F16H 55/48
[52] U.S. Cl. ........................ 198/329; 198/330; 198/842; 198/843; 474/190; 474/191
[58] Field of Search ................. 198/843 C, 842 C, 198/330 C, 329 C, 848, 845; 474/191 C, 190 C, 902, 190, 191

[56] References Cited

U.S. PATENT DOCUMENTS

| | | |
|---|---|---|
| 736,315 | 8/1903 | Touchstone ............................. 198/842 |
| 1,741,842 | 12/1929 | Holtschmit . |
| 2,649,181 | 8/1953 | Hansen ...................................... 198/16 |
| 3,419,127 | 12/1968 | Yost .......................................... 198/16 |
| 3,599,502 | 8/1971 | Craft et al. ............................ 74/319 X |
| 3,651,705 | 3/1972 | Bertinetti et al. ......................... 74/243 |

*Primary Examiner*—William E. Terrell
*Assistant Examiner*—Kenneth W Bower
*Attorney, Agent, or Firm*—Birch, Stewart, Kolasch & Birch, LLP

[57] ABSTRACT

A driven terminal for a passenger conveyor for transferring passenger or luggage. The driven terminal according to the present invention includes a pair of rotating plates mounted on both ends of a rotating shaft, an outer wheel forcibly contacted with the pallet chains having a smooth contacting surface, and an inner wheel having one surface contacted with a periphery of the rotating plate and the other surface contacted and secured to the outer wheel.

13 Claims, 3 Drawing Sheets

DRIVEN WHEEL PASSENGER CONVEYOR

BACKGROUND OF THE INVENTION

1. Field of the Invention

The present invention relates generally to a passenger conveyor, and more particularly to a driven wheel for a passenger conveyor, which is made of an engineering plastic material, and which is operated by a rotating force of a driving wheel of a driving terminal, thereby improving its durability and support force, as well as increasing its operational productivity.

2. Description of the Related Art

The conventional passenger conveyor 1 such as an escalator, moving walk, etc., includes a driving terminal 2 as a drive source of the conveyor, as shown in FIG. 1. The driving terminal includes a driving motor 3 to be powered from a power supply, and a reduction gear 4 for reducing the rotating speed of the driving motor 3. The reduction gear is connected to a transmission gear 7 by driving chains 8. The transmission gear 7 is mounted on one side of driving gears 6 which are installed on both ends of a rotating shaft 5 having a predetermined length to drive the driving gears 6.

The driving gears 6 installed on both the ends of the rotating shaft 5 are operatively connected to pallet chains having a predetermined length. The pallet chains are operatively connected to a driven gear 11 of a driven terminal. Therefore, the driving force of the motor is transmitted to the driven gear 11 of the driven terminal through the reduction gear 4, the driving gears 6, the transmission gear 7, and pallet chains 9. The pallet chains 9 are provided with a plurality of continuous pallets 12 having a predetermined length, on which a passenger or luggage is loaded.

As shown in FIGS. 2 and 3, a tension adjusting device 14 for controlling the tension of the pallet chains 9 is mounted on the driven terminal 10 on which driven gears operatively connected to the pallet chains 9 are provided. The tension adjusting device 14 controls the tension of the pallet chains 9 by changing the position of a rotating shaft 13 of the driven gear 11.

The operation of the passenger conveyor 1 as constructed above will now be described in detail. When the power is applied to the driving motor 3 from an external power supply (not illustrated), the motor operates, and the reduction gear 4 is driven by the driving motor 3. The driving force of the reduction gear 4 is transferred to the driving gears 6 connected to the reduction gear by the driving chains, so that the driving gear 6 is operated. With the operation of the driving gears 6, the pallet chains 9, operatively connected to the driven gear 11, are operated. Because the pallet chains 9 include a number of continuous pallets 12, a passenger or luggage can be transferred to a desired position. At the same time, a hand rail 15 which is installed on a side of protecting barrier 16 is operated at the same speed as that of the pallet chains 9.

It would be understood from the description that when the two driven gears in the driven terminal are mounted on both ends of the rotating shaft, it is very difficult to precisely maintain the tooth symmetry of the two driven gears connected to the ends of the driven gears. If the driven gears are mounted asymmetrically on both ends of the rotating shaft, this asymmetry causes the pallet chains operatively connected to the driving gear and the driven gear to have different levels of tautness. If the tautness of the pallet chains connected to the driven gears disposed on both ends of the rotating shaft are different, then the intervals between the steps will be irregular, so that the steps will be out of line. This deteriorates stability, thereby possibly rendering the conveyor inoperative. As a result, this causes the life of the passenger conveyor to be shortened and causes the supporting force between the pallet chains and the driving gear to deteriorate as well.

SUMMARY OF THE INVENTION

In order to overcome the drawbacks as described above, an object of the present invention is to provide a driven wheel for a passenger conveyor capable of improving the life and supporting force of a conveyor and increasing its operational productivity.

According to one aspect of the present invention, there is provided a driven wheel for a passenger conveyor comprising a plurality of steps for transferring passengers, and a driven wheel rotated by a driving force of a driving wheel of a driving terminal through pallet chains, the driving terminal having a driving mechanism for operating the steps, the driven wheel comprising: a pair of rotating plates mounted on both ends of a rotating shaft; an outer wheel forcibly contacted with the pallet chains having a smooth contacting surface; and an inner wheel having one surface contacted with a periphery of the rotating plate and the other surface contacted and secured to the outer wheel. The outer wheel is formed integrally with the inner wheel.

The inner and outer wheels, and the rotating plate are formed with a plurality of threaded holes, through which fixing members pass, to connect them together.

Preferably, the outer and inner wheel are made of an engineering plastic material. Also, the inner wheel has a wider width than the outer wheel to prevent the pallet chains from interfering with other components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
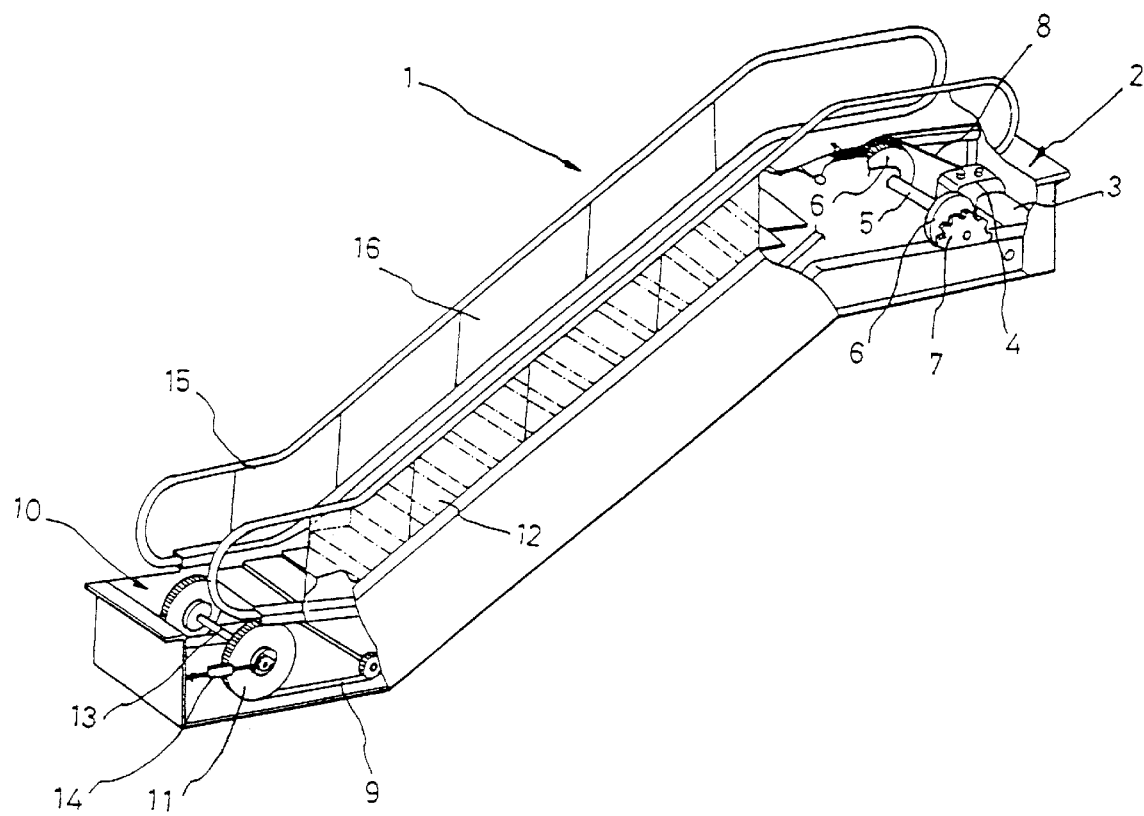
FIG. 1 is a perspective view showing the structure of a conventional passenger conveyor.
Figure 2:
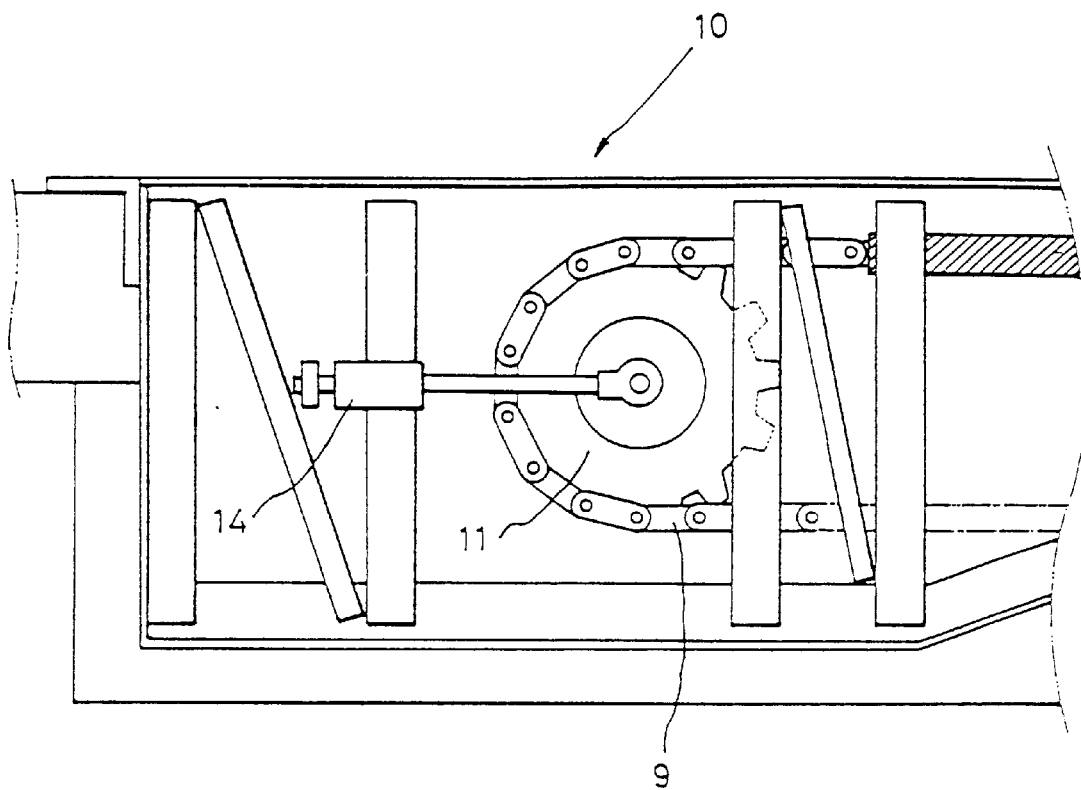
FIG. 2 is a side view of FIG. 1.
Figure 3:
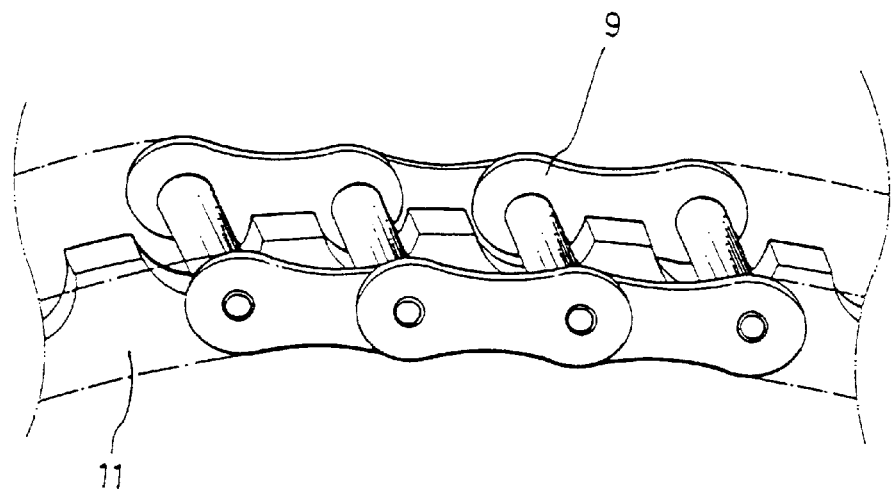
FIG. 3 is a perspective view showing the structure of a driven terminal of the conventional passenger conveyor.
Figure 4:
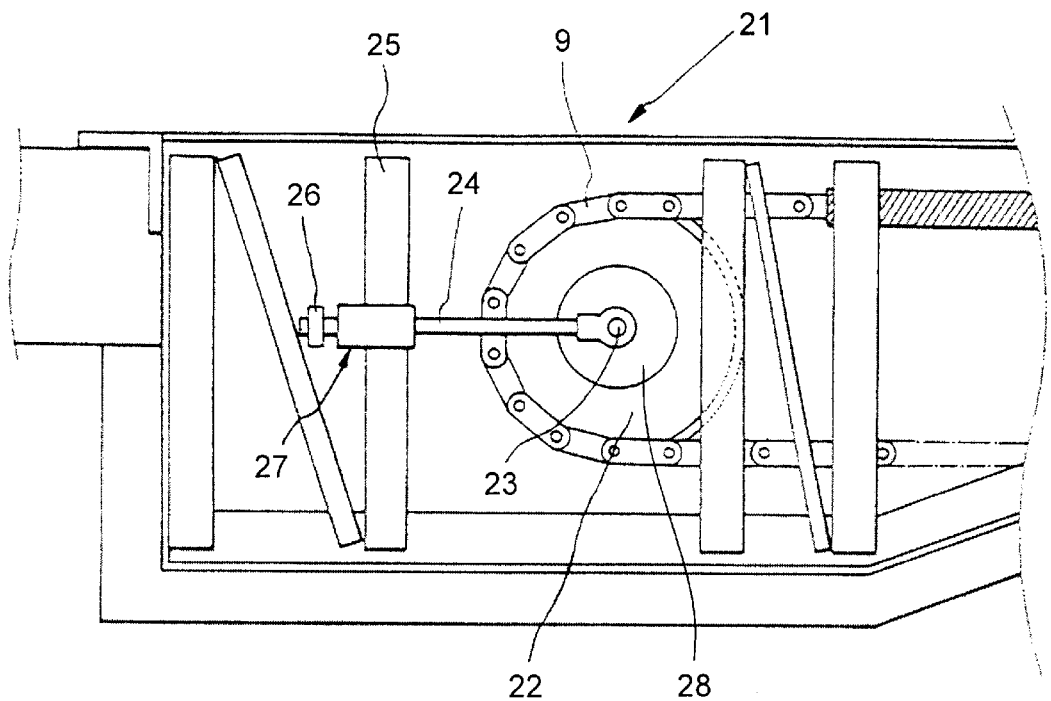
FIG. 4 is a side view showing the structure of a driven terminal of a passenger conveyor according to the present invention.
Figure 5:
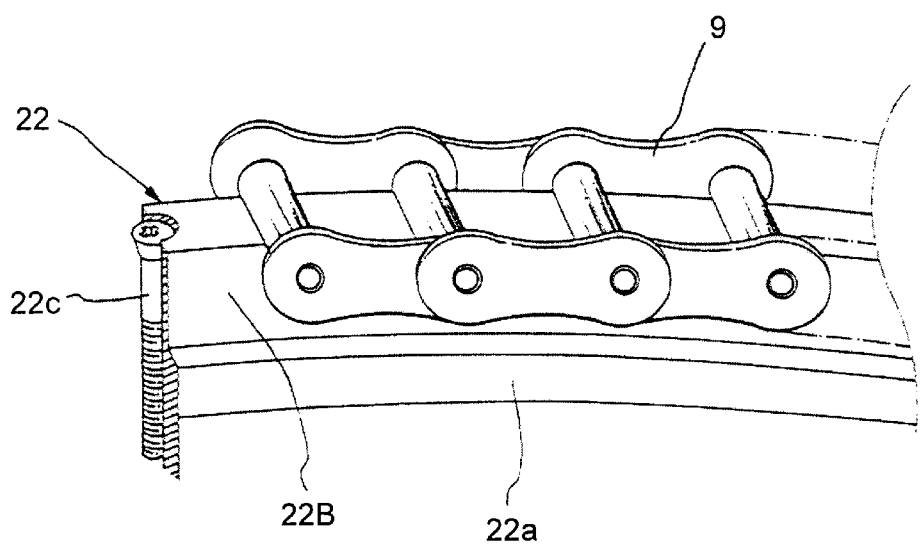
FIG. 5 is a partial perspective showing the structure of a driven wheel of the driven terminal according to the present invention.

FIG. 4 is a side view showing the structure of a driven terminal of a passenger conveyor, and FIG. 5 is a partial perspective showing the structure of a driven wheel 22 of the driven terminal according to the present invention. As shown in FIG. 4, the driven terminal 21 of the passenger conveyor is provided with the driven wheel 22 to which force is transferred through the driving gear (not shown) of a driving terminal and is operated by the pallet chains 9.

The driven wheel 22 according to the present invention comprises a pair of rotating plates 28 (only one shown) mounted on both ends of a rotating shaft.

The driven wheel 22 also comprises an inner wheel 22a connected to both ends of a rotating shaft and an outer wheel 22b force-inserted into the outer edge of the inner wheel 22a. The outer wheel 22b is formed integrally with the inner wheel 22a, as can be seen in FIG. 5. The outer wheel 22b is preferably formed of an engineering plastic material with strong stress and high hardness and is suitable for use in constructions such as gears and structures. The inner and outer wheels include a plurality of threaded holes to be secured with fixing members such as screws 22c.

The outer wheel 22b having a smooth contacting surface is forcibly contacted with the pallet chains 9. The inner wheel 22a has one surface contacted with a periphery of the rotating plate 28 and the other surface contacted and secured to the outer wheel 22b.

The driven terminal 21 includes a tension adjusting device 27 in order to change the position of the rotating shaft 23. The tension adjusting device 27 controls the tension of the pallet chains 9 by changing the position of the rotating shaft 23. The tension adjusting device 27 is composed of a fixing member 24, a nut 26, and a frame 25. One end of the fixing member 24 is fixed to the rotating shaft 23, and the other end has a number of threads formed thereon. The threaded end of the fixing member is movably fitted into the frame 25 defining the driven terminal 21. The nut 26 is engaged with the threaded end. Therefore, the tension of the pallet chains 9 can be controlled by moving the nut 26 forward and backward.

The force for driving the passenger conveyor such as an escalator and a moving walk is transmitted to the driven terminal 21 from the driving terminal 2. In transmitting the driving force, the rotation of the driven wheel 22 is effected in such a manner that the driving force generated from the driving terminal 2 is transferred to the driving gears 6 through the reduction gear 4 and the transmission gear 7, and thus the pallet chains 9 connected to the driving gears 6 are rotated since it is force-contacted with the outer wheel 22b of the driven wheel 22.

As is apparent from the description hereinbefore, according to the driven terminal of the passenger conveyor of the present invention, since the driven wheel is not formed of a gear type but is composed of the inner and outer wheels made of an engineering plastic and mounted on the driven terminal, the symmetry of the driven wheels is always maintained while they are mounted on both ends of the rotating shaft. Further, the tautness of the pallet chains are not only changed differently, but also the side wear thereof is prevented. Therefore, it is possible to improve the supporting force of the passenger conveyor and the life thereof as well as simplifying its structure and increasing its operational productivity.

While the present invention has been described and illustrates herein with reference to the preferred embodiment thereof, it will be understood by those skilled in the art that various changes in form and details may be made therein without departing from the spirit and scope of the invention.

What is claimed is:

1. A conveyor, comprising:
   at least one pallet chain;
   a plurality of movable transport elements being connectable to said at least one pallet chain; and
   at least one driven wheel being driven by said at least one pallet chain, wherein said at least one driven wheel further includes,
   a rotating shaft;
   an inner wheel attached to said rotating shaft; and
   an outer wheel having a smooth substantially hard outer periphery, said outer wheel securably attached to said inner wheel.

2. The conveyor as claimed in claim 1, wherein the outer wheel and the inner wheel form one contiguous wheel member.

3. The conveyor as claimed in claim 1, wherein the inner and outer wheels are formed with a plurality of threaded holes, through which fixing members pass to secure said inner and outer wheels together.

4. The conveyor as claimed in claim 1, wherein the outer and inner wheels are made of engineering plastic material.

5. The conveyor as claimed in claim 1, wherein the inner wheel has a wider width than the outer wheel.

6. The conveyor as claimed in claim 1, wherein said movable transport elements are a plurality of steps.

7. The conveyor as claimed in claim 1, wherein said conveyor is a passenger conveyor.

8. The conveyor as claimed in claim 1, wherein said outer wheel is composed of a plastic material having a high stress and hardness threshold.

9. The conveyor as claimed in claim 1, wherein said outer periphery of said outer wheel is a hard surface.

10. The conveyor as claimed in claim 1, further comprises a pair of rotating plates mounted on at least one end of said rotating shaft, said rotating plates further facilitating rotation of said inner wheel.

11. The driven wheel as claimed in claim 10, wherein a surface of said inner wheel is in contact with at least one of said rotating plates and another surface of said inner wheel is in contact with said outer wheel.

12. The conveyor as claimed in claim 1, wherein said inner wheel and said outer wheel are composed of the same material.

13. The conveyor as claimed in claim 12, wherein said material is a plastic having a substantially high stress and hardness threshold.

* * * * *